US010437763B2

(12) United States Patent
Vertenten

(10) Patent No.: US 10,437,763 B2
(45) Date of Patent: Oct. 8, 2019

(54) METHOD AND DEVICE FOR UNIVERSAL SERIAL BUS (USB) COMMUNICATION

(71) Applicant: NXP B.V., Eindhoven (NL)

(72) Inventor: Bart Vertenten, Merelbeke (BE)

(73) Assignee: NXP B.V., Eindhoven (NL)

( * ) Notice: Subject to any disclaimer, the term of this patent is extended or adjusted under 35 U.S.C. 154(b) by 115 days.

(21) Appl. No.: 15/481,785

(22) Filed: Apr. 7, 2017

(65) Prior Publication Data
US 2018/0293198 A1 Oct. 11, 2018

(51) Int. Cl.
G06F 13/42 (2006.01)
G06F 13/38 (2006.01)
G06F 3/038 (2013.01)
G06F 13/20 (2006.01)
G06F 13/40 (2006.01)

(52) U.S. Cl.
CPC ............ *G06F 13/387* (2013.01); *G06F 3/038* (2013.01); *G06F 13/20* (2013.01); *G06F 13/385* (2013.01); *G06F 13/4027* (2013.01); *G06F 13/4282* (2013.01); *G06F 2213/0042* (2013.01)

(58) Field of Classification Search
None
See application file for complete search history.

(56) References Cited

U.S. PATENT DOCUMENTS 6,389,029 B1   5/2002   McAlear
8,553,753 B2 * 10/2013 Hsieh ................ H04L 25/03006
                                                  375/231
8,719,475 B2 *  5/2014 Ma ........................ G06F 13/426
                                                  710/110
9,626,517 B2 *  4/2017 Obukhov .............. G06F 21/602
2004/0095929 A1* 5/2004 Aoshima ............... H04L 1/0061
                                                  370/389
2004/0177197 A1   9/2004  McLeod
2007/0245059 A1  10/2007  Tjia
2011/0051934 A1   3/2011  Ikeda
2012/0084469 A1   4/2012  Tang et al.

(Continued)

FOREIGN PATENT DOCUMENTS

WO  WO-2007/067191 A2   6/2007
WO  WO-2007/067191 A3   6/2007
WO  WO-2015/199877 A1  12/2015

OTHER PUBLICATIONS

Usb-If; Universal Serial Bus 3.1 Specification, Revision 1.0—Chapter 6—Physical Layer; retreived from the Internet www.usb.org on Jun. 21, 2018); 57 pages (Jul. 26, 2013).

(Continued)

*Primary Examiner* — Elias Mamo

(57) ABSTRACT

Embodiments of methods and devices for Universal Serial Bus (USB) communication are described. In an embodiment, a method for USB communication involves processing received USB data, including searching for a predefined symbol in a version of the received USB data, outputting predefined USB data during the processing of the received USB data and switching from outputting the predefined USB data to outputting recovered USB data in response to a finding of the predefined symbol in the version of the received USB data. The recovered USB data is derived from the received USB data. Other embodiments are also described.

21 Claims, 7 Drawing Sheets

(56) References Cited

U.S. PATENT DOCUMENTS

| | | | |
|---|---|---|---|
| 2012/0317446 A1* | 12/2012 | Jaramillo | G06F 11/221 714/43 |
| 2013/0132625 A1 | 5/2013 | Hall | |
| 2014/0122752 A1 | 5/2014 | Toivanen et al. | |
| 2014/0149628 A1 | 5/2014 | Lin | |
| 2017/0017604 A1* | 1/2017 | Chen | G06F 13/4221 |
| 2017/0371831 A1 | 12/2017 | Das Sharma | |
| 2019/0068397 A1* | 2/2019 | Chen | H04L 12/40 |

OTHER PUBLICATIONS

Usb-If: "USB-IF Compliance Updates"; retreived from the internet http://compliance.usb.org/index.asp?UpdateFile=USB3&Format=Standard on Jun. 21, 2018; 4 pages (Jan. 31, 2017).

Usb-If; Universal Serial Bus 3.1 Specification, Revision 1.0—Appendix E—Repeaters; retreived from the Internet www.usb.org on Jun. 21, 2018); 20 pages (Oct. 31, 2014).

U.S. Appl. No. 15/487,260, not yet published; 21 pages (filed Apr. 13, 2017).

Shettigara, Rajanatha "Bit Level Retimer (BLR)", MegaChips, 20 pgs. (May 18, 2016).

Non Final Office Action for U.S. Appl. No. 15/487,260; 17 pages (dated Aug. 7, 2018).

Final Office Action for U.S. Appl. No. 15/487,260; 23 pages (dated Nov. 30, 2018).

Universal Serial Bus 3.0 Specification Chapter 3-11, 400 pgs., retreived from the Internet Oct. 20, 2011 at http://www/usb.org (Nov. 12, 2018).

Non Final Office Action for U.S. Appl. No. 15/487,260; 15 pages (dated Mar. 13, 2019).

\* cited by examiner

METHOD AND DEVICE FOR UNIVERSAL SERIAL BUS (USB) COMMUNICATION

Bus interface protocols can be used for data communications over wired interfaces. A particular type of bus interface protocol is the Universal Serial Bus (USB), which can be used, for example, to attach external peripherals to host devices, to interface between peripherals, to charge devices, and for other applications. USB protocol provides various different data transfer speeds, charging modes, and power providing and sinking capabilities.

During signal transfer between USB devices, signal deterioration may occur, for example, due to noises or interferences. In addition, the connection length (e.g., the length of a USB cable) between USB devices can cause the communication path latency to exceed a latency threshold defined in the USB specification. For example, if no response is received from a USB receiving device within a specified amount of time because of the communication path latency, a USB transmitting device may consider the USB communication as a failure and start retraining the USB communication link between the USB receiving device and the USB transmitting device.

SUMMARY

Embodiments of methods and devices for USB communication are described. In an embodiment, a method for USB communication involves processing received USB data, including searching for a predefined symbol in a version of the received USB data, outputting predefined USB data during the processing of the received USB data and switching from outputting the predefined USB data to outputting recovered USB data in response to a finding of the predefined symbol in the version of the received USB data. The recovered USB data is derived from the received USB data. Other embodiments are also described.

In an embodiment, processing the received USB data includes performing USB data decoding and USB data encoding.

In an embodiment, outputting the predefined USB data during the processing of the received USB data includes outputting the predefined USB data to a USB device before performing USB data decoding and USB data encoding.

In an embodiment, processing the received USB data includes comparing a disparity value of the version of the received USB data with a disparity value of the predefined USB data. Switching from outputting the predefined USB data to outputting the recovered USB data includes switching from outputting the predefined USB data to outputting the recovered USB data if the disparity value of the version of the received USB data matches the disparity value of the predefined USB data.

In an embodiment, switching from outputting the predefined USB data to outputting the recovered USB data includes controlling a multiplexer into which the predefined USB data and the recovered USB data are input.

In an embodiment, processing the received USB data includes decoding a first symbol of the version of the received USB data into a first word of decoded USB data. A bit length of the first symbol is longer than a bit length of the first word.

In an embodiment, processing the received USB data includes decoding 10-bit symbols of the version of the received USB data into 8-bit words of decoded USB data.

In an embodiment, processing the received USB data includes buffering the received USB data, searching for the predefined symbol in buffered USB data, decoding the buffered USB data, and encoding decoded USB data into encoded USB data.

In an embodiment, processing the received USB data includes decoding the received USB data into decoded USB data, buffering the decoded USB data, searching for the predefined symbol in buffered USB data, and encoding the buffered USB data into encoded USB data.

In an embodiment, processing the received USB data further includes inserting a predefined data sequence into the encoded USB data in response to a finding of the predefined symbol in the buffered USB data.

In an embodiment, buffering the decoded USB data includes dividing the decoded USB data into a plurality of segments and buffering each segment in a different buffer.

In an embodiment, encoding the buffered USB data into the encoded USB data includes encoding a first word of the buffered USB data into a first symbol of the encoded USB data. A bit length of the first symbol is longer than a bit length of the first word.

In an embodiment, encoding the buffered USB data into the encoded USB data includes encoding 8-bit words of the buffered USB data into 10-bit symbols of the encoded USB data.

In an embodiment, the method further includes buffering the recovered USB data in a first in first out (FIFO) buffer before outputting the recovered USB data to a USB device.

In an embodiment, the method further includes outputting the received USB data to a USB device.

In an embodiment, a USB retimer logic circuit includes a local data pattern generator configured to generate predefined USB data, a data processor operably connected to the local data pattern generator and configured to process received USB data, including searching for a predefined symbol in a version of the received USB data, and a switching system configured to switch from outputting the predefined USB data to outputting recovered USB data in response to a finding of the predefined symbol in the version of the received USB data. The recovered USB data is derived from the received USB data.

In an embodiment, the switching system is configured to output the predefined USB data to a USB device before USB data decoding and USB data encoding are performed on the received USB data.

In an embodiment, the data processor is configured to compare a disparity value of the version of the received USB data with a disparity value of the predefined USB data. The switching system is configured to switching from outputting the predefined USB data to outputting the recovered USB data if the disparity value of the version of the received USB data matches the disparity value of the predefined USB data.

In an embodiment, the data processor includes a decoder configured to decode received USB data into decoded USB data, a buffer device configured to buffer the decoded USB data and to search for the predefined symbol in buffered USB data, and an encoder configured to encode the buffered USB data into encoded USB data.

In an embodiment, a USB retimer includes first and second USB receivers, first and second USB transmitters, and first and second USB retimer logic circuits connected between the first and second USB receivers and the first and second USB transmitters. Each of the first and second USB retimer logic circuits includes a local data pattern generator configured to generate predefined USB data, a data processor operably connected to the local data pattern generator, and a switching system. The data processor includes an 8b/10b decoder configured to decode 10-bit symbols of received USB data from a corresponding USB receiver of the first and second USB receivers into 8-bit words of decoded USB data, a buffer device configured to buffer the decoded USB data and to search for a predefined symbol in buffered USB data, and an 8b/10b encoder configured to encode 8-bit words of the buffered USB data into 10-bit symbols of encoded USB data. The switching system is configured to switch from outputting the predefined USB data to a corresponding USB transmitter of the first and second USB transmitters to outputting recovered USB data to the corresponding USB transmitter of the first and second USB transmitters in response to a finding of the predefined symbol in the buffered USB data. The recovered USB data is a version of the encoded USB data.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
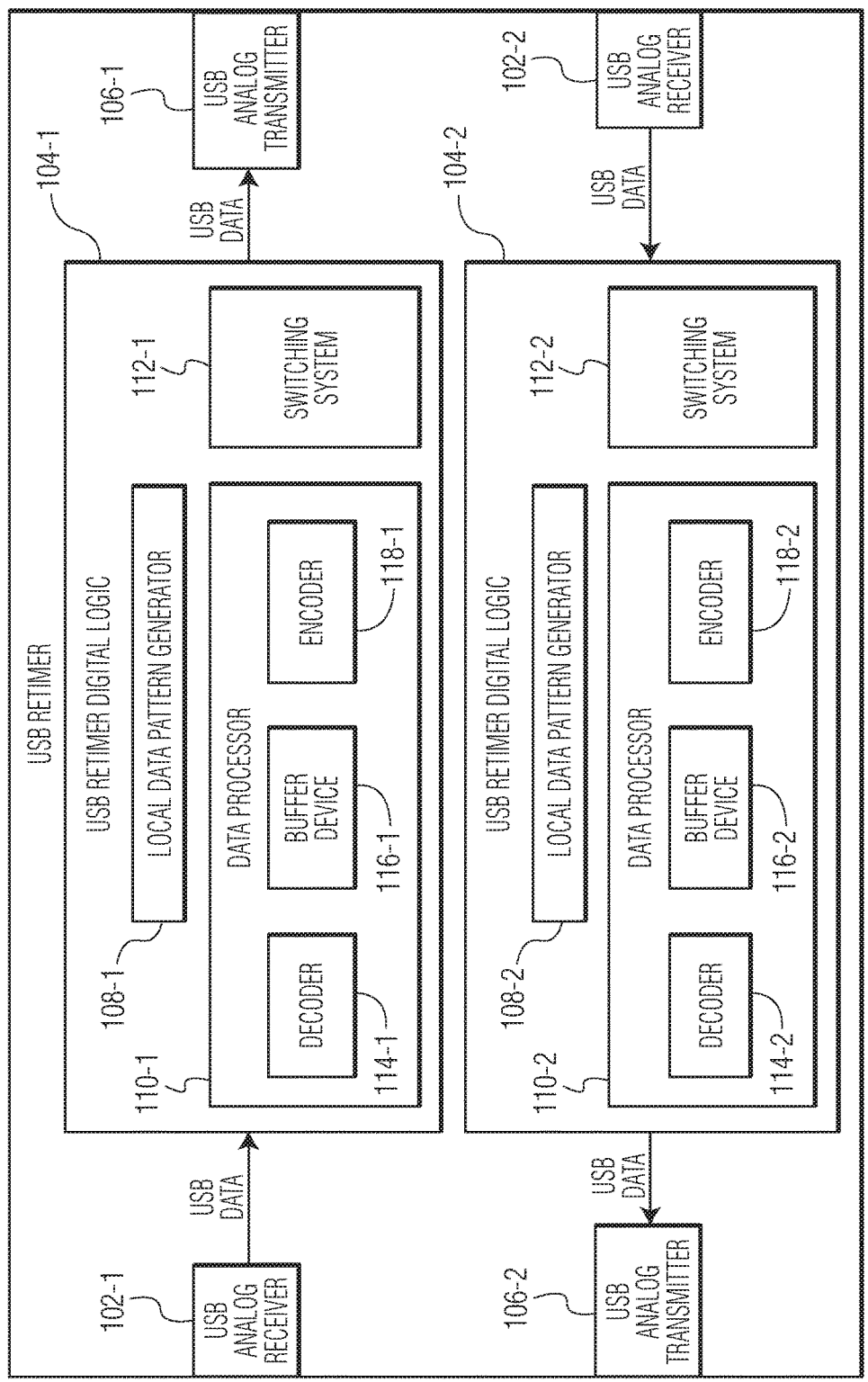
FIG. 1 is a functional block diagram of a USB retimer in accordance with an embodiment of the invention.

FIG. 1 is a functional block diagram of a USB retimer 100 in accordance with an embodiment of the invention. In the embodiment depicted in FIG. 1, the USB retimer includes first and second USB analog receivers 102-1, 102-2, first and second USB digital logics 104-1, 104-2, and first and second USB analog transmitters 106-1, 104-2. In some embodiments, the USB retimer is a component within a USB interface device. Examples of a USB interface device include, without being limited to, a USB Type-C compliant interface device, a USB Type-A compliant interface device, a USB Mini Type-A compliant interface device, a USB Micro Type-A compliant interface device, a USB Type-B compliant interface device, a USB Mini Type-B compliant interface device, and a USB Micro Type-B compliant interface device. In an embodiment, the USB retimer is a component within a USB cable or other USB interface device. Although the illustrated USB retimer is shown with certain components and described with certain functionality herein, other embodiments of the USB retimer may include fewer or more components to implement the same, less, or more functionality. For example, although the USB retimer is shown in FIG. 1 as including two USB analog receivers and two USB analog transmitters, in other embodiments, the USB retimer includes more or less analog USB receivers/USB analog transmitters.

Each USB analog receiver 102-1 or 102-2 of the USB retimer 100 is connectable to the corresponding USB retimer digital logic 104-1 or 104-2, for example, through one or more wires. Each USB analog receiver may include a clock/data recovery (CDR) circuit that can deserialize and recover USB data bits or other common USB transceiver components. In some embodiments, each USB analog receiver is a USB connector with USB pins. Each USB analog receiver may receive USB data from other USB device, for example, through USB pins. In some embodiments, each USB analog receiver may receive USB data from a USB power-sourcing device, such as a USB host. Examples of the USB power-sourcing device include, without being limited to, computers, power bricks, smart phones, and tablets. In some embodiments, each USB analog receiver recovers and deserializes USB data, e.g., data received on USB pins.

Each USB retimer digital logic 104-1 or 104-2 of the USB retimer 100 can be used to retime or synchronize USB data to mitigate deterioration during signal transfer from the corresponding USB analog receiver 102-1 or 102-2 to the corresponding USB analog transmitter 106-1 or 106-2. For example, each USB retimer digital logic can synchronize and regenerate deteriorated signals. In the embodiment depicted in FIG. 1, each USB retimer digital logic includes a local data pattern generator 108-1 or 108-2, a data processor 110-1 or 110-2 operably connected to the local data pattern generator, and a switching system 112-1 or 112-2. Although each USB retimer digital logic is shown in FIG. 1 as including the local data pattern generator, the data processor, and the switching system, in other embodiments, the USB retimer digital logic may include less or more component to implement less or more functionalities. For example, each USB retimer digital logic may include one or more buffer devices, such as a first-in-first-out (FIFO) buffer.

Each local data pattern generator 108-1 or 108-2 of the USB retimer digital logic 104-1 or 104-2 is configured to generate predefined USB data. The predefined USB data may be a data pattern (e.g., a training sequence) that is defined in USB specification, such as the USB 3.1 specification. Each local pattern generator may be used for generating training sequences and compliance patterns as defined in the USB3.1 specification. In some embodiments, each local data pattern generator includes at least one storage unit (e.g., a memory, a cache, a buffer or a disk) configured to store the predefined USB data and/or at least one controller (e.g., a microcontroller or a processor). The predefined USB data can be transmitted from the USB retimer 100 to a corresponding USB device during the start of USB communication to prevent the communication path latency from exceeding as defined in USB specification. For example, if no response is received within a specified amount of time, a corresponding USB device may consider the USB communication as a failure and start retraining the USB communication link. By sending the predefined USB data to a corresponding USB device during the start of USB communication, the USB retimer can keep the communication path latency below a certain threshold while configuring its USB analog receiver to receive incoming data (e.g., to meet the maximum data path latency of 50 nanoseconds as defined in the USB 3.1 specification).

Each data processor 110-1 or 110-2 of the USB retimer digital logic 104-1 or 104-2 is configured to process received USB data and to search for a predefined symbol in a version of the received USB data. In some embodiments, the version of the received USB data is a buffered version of the received USB data. In some other embodiments, the version of the received USB data is a decoded version of the received USB data. The data processor may be implemented using at least one storage unit (e.g., a memory, a cache, a buffer or a disk) and/or at least one controller (e.g., a microcontroller or a processor).

Each USB retimer digital logic 104-1 or 104-2 can output the predefined USB data during the processing of the received USB data. In some embodiments, the USB retimer outputs the predefined USB data before USB data decoding and USB data encoding are performed on the received USB data.

Each switching system 112-1 or 112-2 of the USB retimer 104-1 or 104-2 is configured to switch from outputting the predefined USB data that is generated by the corresponding local data pattern generator 108-1 or 108-2 to outputting recovered USB data in response to the finding of the predefined symbol in the version of the received USB data. The recovered USB data may be derived from the version of the received USB data. In some embodiments, the recovered USB data is a buffered version of processed USB data that is generated by the corresponding data processor 110-1 or 110-2. In some embodiments, the data processor compares a disparity value of the version of the received USB data with a disparity value of the predefined USB data. In these embodiments, the switching system 112-1 or 112-2 switches from outputting the predefined USB data to outputting the recovered USB data if the disparity value of the version of the received USB data matches the disparity value of the predefined USB data. Each switching system 112-1 or 112-2 may be implemented using one or more switching devices (e.g., multiplexers or other type of switching device).

Compared to a USB repeater without a USB retimer, the USB retimer 100 depicted in FIG. 1 can use the USB retimer digital logic 104-1 or 104-2 to retime or synchronize USB data to mitigate deterioration during USB data transfer. For example, a USB repeater such as a USB redriver can perform signal equalization and amplification. However, a USB redriver generally cannot remove jitter or mitigate deterioration. Consequently, compared to a USB repeater, the USB retimer 100 depicted in FIG. 1 can use the USB retimer digital logic 104-1 or 104-2 to mitigate deterioration during signal transfer from the corresponding USB analog receiver 102-1 or 102-2 to the corresponding USB analog transmitter 106-1 or 106-2. In addition, compared to an elasticity buffer based USB retimer, the USB retimer 100 depicted in FIG. 1 can reduce the communication path latency, disparity errors and/or decoding/encoding errors. The USB retimer digital logic 104-1 or 104-2 depicted in FIG. 1 uses the data processor 110-1 or 110-2 to search for a predefined symbol in USB data and the switching system 112-1 or 112-2 to switch from outputting predefined USB data to outputting recovered USB data in response to the finding of the predefined symbol in the USB data. By outputting predefined USB data during the processing of the received USB data, the USB retimer 100 depicted in FIG. 1 can keep the communication path latency below a certain threshold. Consequently, the USB retimer 100 can meet the maximum data path latency of 50 nanoseconds defined in the USB 3.1 specification when used with legacy USB3.0 devices. In addition, by switching from outputting predefined USB data to outputting recovered USB data in response to the finding of the predefined symbol in the USB data, the USB retimer 100 depicted in FIG. 1 can reduce communication disparity error. For example, the USB retimer 100 can perform data alignment based on the predefined symbol such that switching between the predefined USB data and the recovered USB data causes less or no decoding/encoding errors.

In the embodiment depicted in FIG. 1, each data processor 110-1 or 110-2 includes a decoder 114-1 or 114-2, a buffer device 116-1 or 116-2 and an encoder 118-1 or 118-2. In some embodiments, each decoder is configured to decode a version of received USB data (e.g., USB data received from the corresponding USB analog receiver 102-1 or 102-2) into decoded USB data. Each buffer device 116-1 or 116-2 may be configured to buffer a version of the received USB data (e.g., decoded USB data that is generated by the decoder) and to search for a predefined symbol in buffered USB data. In some embodiments, each decoder 114-1 or 114-2 is configured to decode a first symbol of the version of the received USB data into a first word of decoded USB data. In these embodiments, the bit length of the first symbol is longer than the bit length of the first word. For example, each decoder 114-1 or 114-2 can decode 10-bit symbols of received USB data into 8-bit words of decoded USB data. Each encoder 118-1 or 118-2 may be configured to encode a version of received USB data, which may be buffered USB data that is stored in the buffer or decoded USB data that is generated by the corresponding decoder 114-1 or 114-2, into encoded USB data. In some embodiments, each encoder 118-1 or 118-2 is configured to encode a first word of USB data into a first symbol of encoded USB data. In these embodiments, the bit length of the first symbol is longer than the bit length of the first word. For example, each encoder can encode 8-bit words of USB data into 10-bit symbols of encoded USB data. The decoder 114-1 or 114-2 and the corresponding encoder 118-1 or 108-2 can enable switching between the predefined USB data and the recovered USB data with less disparity error or without any disparity error. Each buffer device 116-1 or 116-2 can align USB data such that switching between the predefined USB data and the recovered USB data causes less or no decoding/encoding errors. The decoders and/or the encoders can be implemented using hardware, software and/or firmware, or a combination of hardware, software and/or firmware. In some embodiments, at least one of the decoders and/or the encoders can be implemented using at least one controller (e.g., a microcontroller or a processor). At least one of the buffer devices may be implemented using at least one storage unit (e.g., a memory, a cache, a buffer or a disk).

In an example operation of the data processor 110-1, the decoder 114 decodes received USB data into decoded USB data, the buffer device 116 buffers the decoded USB data and searches for a predefined symbol in buffered USB data, and the encoder 118 encodes the buffered USB data into encoded USB data. The switching system 112 switches from outputting predefined USB data to outputting recovered USB data in response to a finding of the predefined symbol in the buffered USB data.

In another example operation of the data processor 110-1, the buffer device 116 buffers received USB data and searches for a predefined symbol in received USB data, the decoder 114 decodes the buffered USB data into decoded USB data, and the encoder 118 encodes the decoded USB data into encoded USB data. The switching system 112 switches from outputting predefined USB data to outputting recovered USB data in response to a finding of the predefined symbol in the buffered USB data.

Each USB analog transmitter 106-1 or 106-2 of the USB retimer 100 is connectable to the corresponding USB retimer digital logic 104-1 or 104-2, for example, through one or more wires. Each USB analog transmitter may include USB transceiver components that are well-known in the field. In some embodiments, each USB analog transmitter is a USB connector with USB pins. Each USB analog transmitter may transmit USB data to other USB device, for example, through USB pins.

Figure 2:
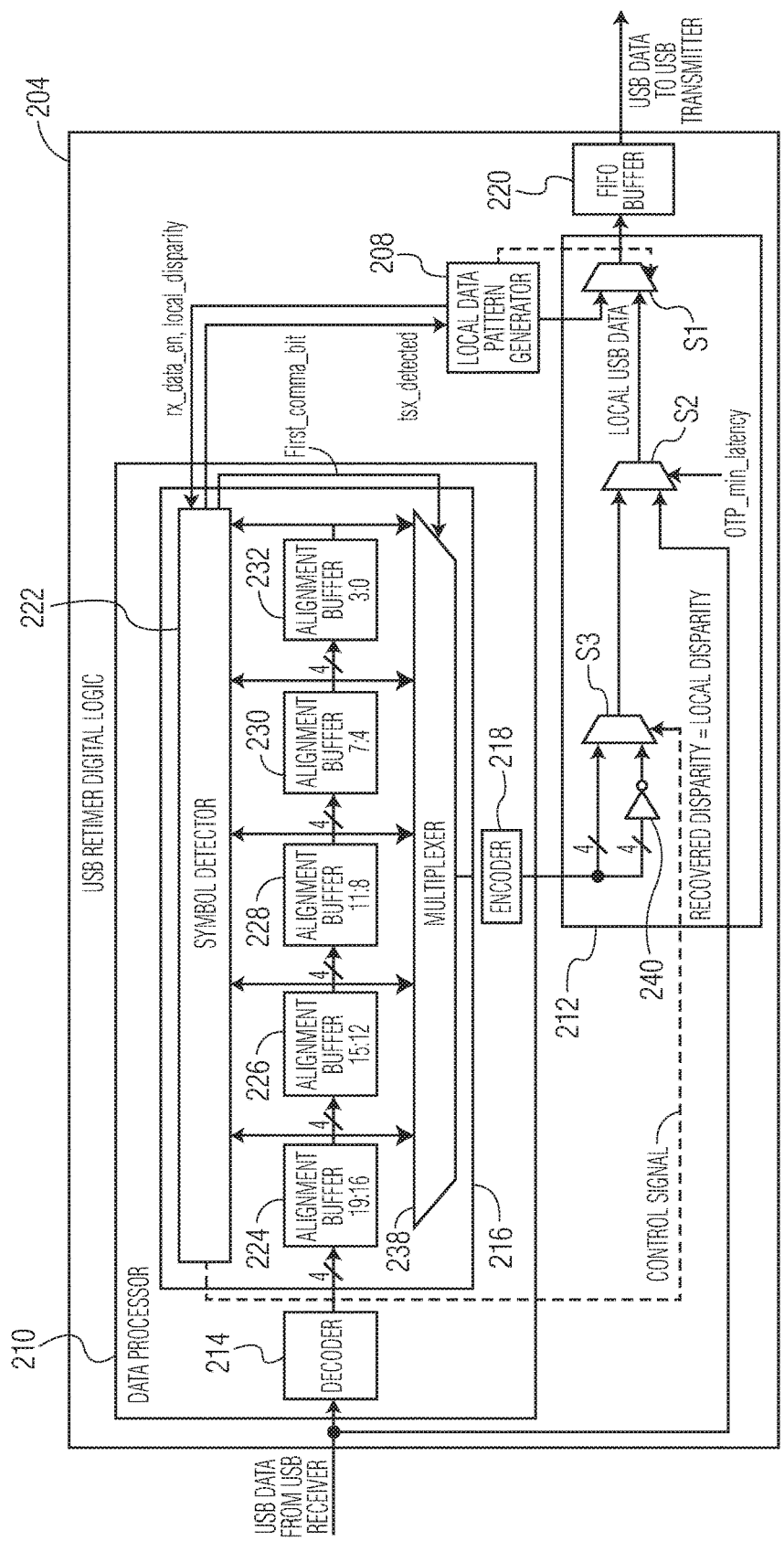
FIG. 2 depicts an embodiment of a USB retimer digital logic of the USB retimer depicted in FIG. 1.

FIG. 2 depicts an embodiment of the USB retimer digital logic 104-1 or 104-2 of the USB retimer 100 depicted in FIG. 1. In the embodiment depicted in FIG. 2, a USB retimer digital logic 204 includes a local data pattern generator 208, a data processor 210 operably connected to the local data pattern generator, a switching system 212, and an optional FIFO buffer 220 for buffering USB data before outputting to the corresponding USB analog transmitter 106-1 or 106-2. The data processor 210 includes a decoder 214, a buffer device 216, which includes a symbol detector 222, alignment buffers 224, 226, 228, 230, 232, and a multiplexer 238, an encoder 218, and an optional data inserter 240 (e.g., a SKIP (SKP) data inserter). The switching system 212 includes three multiplexers, "S1," "S2," "S3." The USB retimer digital logic may be an integrated circuit (IC) device or part of an IC device that includes additional components. For example, the USB retimer digital logic may be integrated/implemented on an IC chip. The USB retimer digital logic 204 depicted in FIG. 2 is one possible embodiment of the USB retimer digital logic 104-1 or 104-2 depicted in FIG. 1. For example, the local data pattern generator 208, the data processor 210 and the switching system 212 depicted in FIG. 2 are embodiments of the local data pattern generator 108-1 or 108-2, the data processor 110-1 or 110-2 and the switching system 112-1 or 112-2 depicted in FIG. 1, respectively. The decoder 214, the buffer device 216 and the encoder 218 depicted in FIG. 2 are embodiments of the decoder 114-1 or 114-2, the buffer device 116-1 or 116-2 and the encoder 118-1 or 118-2 depicted in FIG. 1, respectively. However, the USB retimer digital logic 104-1 or 104-2 depicted in FIG. 1 is not limited to the embodiment shown in FIG. 2. For example, in some embodiments, the USB retimer digital logic 204 does not include the FIFO buffer 220.

The local data pattern generator 208 of the USB retimer digital logic 204 is configured to generate predefined USB data, which may be a data pattern (e.g., a training sequence) that is defined in USB specification, such as the USB 3.1 specification. The predefined USB data is also known as local USB data.

The data processor 210 of the USB retimer digital logic 204 is configured to process received USB data and to search for a predefined symbol in a decoded version of the received USB data. The decoder 214 may be configured to decode received USB data into decoded USB data. The buffer device 216 may be configured to buffer the decoded USB data and search for a predefined symbol in buffered USB data. In some embodiments, each of the alignment buffers 224, 226, 228, 230, 232 is configured to store a number of decoded USB data bits (e.g., 4 bits of decoded USB data). The symbol detector 222 may be configured to search for a predefined symbol in USB data buffered at the alignment buffers and to control the multiplexer 238 to allow certain buffered USB data to pass through. The encoder 218 may be configured to encode the buffered USB data into encoded USB data. In an embodiment, the decoder is an 8b/10b decoder, which decodes received USB data of 10 bits into decoded USB data of 8 bits and the encoder is an 8b/10b encoder, which encodes USB data of 8 bits into encoded USB data of 10 bits.

The switching system 212 of the USB retimer digital logic 104 is configured to switch from outputting the predefined USB data that is generated by the local data pattern generator 208 to outputting recovered USB data in response to the finding of the predefined symbol in the decoded version of the received USB data. In some embodiments, the switching system is controlled by the local data pattern generator, the data processor 210 and/or an external source. For example, the multiplexer, S1, can be controlled by the local data pattern generator. The multiplexer, S2, can be controlled by the data processor or an external source. The multiplexer, S3, can be controlled by the data processor (e.g., the symbol detector).

In an example operation of the USB retimer digital logic 204 depicted in FIG. 2, when the USB communication between the USB retimer 100 and a corresponding USB device begins/starts up, the USB retimer digital logic immediately starts transmitting local USB data that is generated by the local data pattern generator 208 (e.g., a training signal of equalization (TSEQ) ordered set or a first training sequence (TS1) ordered set as defined in the USB 3.1 specification). In particular, the multiplexer, S1, of the switching system 212 is controlled by the local data pattern generator to allow the local USB data to be transferred to the FIFO buffer 220 while simultaneously blocking data received from the multiplexer, S2, from being transferred to the FIFO buffer. The USB retimer digital logic keeps transmitting the local USB data while the corresponding USB analog receiver 102-1 or 102-2 starts up to prevent the communication path latency from exceeding a latency threshold as defined in USB specification, which can cause the corresponding USB device to consider the USB communication as a failure and start retraining the USB communication link. After the corresponding USB analog receiver 102-1 or 102-2 starts up, USB data that is generated by the USB analog receiver (e.g., serial data bits recovered from a USB cable or a USB connector) is transmitted to the decoder 214 for decoding, followed by the alignment buffers, 224, 226, 228, 230, 232 for buffering, and the encoder 218 for encoding. For example, the decoder may be an 8b/10b decoder, which decodes received USB data of 10 bits into decoded USB data of 8 bits and the encoder may be an 8b/10b encoder, which encodes USB data of 8 bits into encoded USB data of 10 bits. The local data pattern generator indicates when USB data must be stored in the alignment buffers, for example, using an "rx_data_en" signal transmitted to the symbol detector 222. The local data pattern generator also indicates the disparity value of the local USB data, for example, using a "local_disparity" signal transmitted to the symbol detector. When the rx_data_en signal is at logic high, the symbol detector searches for a predefined symbol (e.g., a first training sequence (TS1) symbol or a second training sequence (TS2) symbol) in the decoded USB data stream. If the predefined symbol is found in the decoded USB data stream, the symbol detector notifies the local data pattern generator, for example, by changing a "tsx_detected" signal transmitted to the local data pattern generator from logic low to logic high. Once the local data pattern generator is notified (e.g., by setting the tsx_detected signal to logic high), the local data pattern generator starts to look for the right moment to switch over between local USB data and USB data from the data processor. The local data pattern generator can control the multiplexer, S1, to allow data received from the multiplexer, S2, to be transferred to the FIFO buffer while simultaneously blocking the local USB data from being transferred to the FIFO buffer. The multiplexer, S2, can be controlled (e.g., using an "OTP_min_latency" signal from an external source) to allow USB data from the USB analog receiver to bypass the data processor such that a low data path latency can be achieved. For example, the multiplexer, S2, can be controlled to allow data received from the USB analog receiver to be directly transferred to the multiplexer, S1, while simultaneously blocking data received from the multiplexer, S3, from being transferred to the multiplexer, S1.

The training signal of training signal of equalization (TSEQ) can be used for initializing bit alignment, symbol alignment and optimization equalization. In the embodiment depicted in FIG. 2, the training signal of equalization (TSEQ) can be stored in the local data pattern generator 208 as the local USB data. Table 1 provides an example of the training signal of equalization (TSEQ) having a "symbol number" column, a "name" column and a "value" column. For example, name "K28.5" in symbol number 0 represents the control type code of the encoding mechanism, which has a corresponding value "COM (comma)" used in symbol alignment. The name "D31.7" in symbol number 1 represents the control type code of the encoding mechanism, which has a corresponding value of "0xFF."

TABLE 1

| Symbol Number | Name  | Value       |
|---------------|-------|-------------|
| 0             | K28.5 | COM (Comma) |
| 1             | D31.7 | FFh         |
| 2             | D23.0 | 17h         |
| 3             | D0.6  | C0h         |
| 4             | D20.0 | 14h         |
| 5             | D18.5 | B2h         |
| 6             | D7.7  | E7h         |
| 7             | D2.0  | 02h         |
| 8             | D2.4  | 82h         |
| 9             | D18.3 | 72h         |
| 10            | D14.3 | 6Eh         |
| 11            | D8.1  | 28h         |
| 12            | D6.5  | A6h         |
| 13            | D30.5 | BEh         |
| 14            | D13.1 | 6Dh         |
| 15            | D31.5 | BFh         |
| 16-31         | D10.2 | 4Ah         |

First/second Training sequences (TS1 or TS2) can be used for symbol alignment. In some embodiments, Training sequences TS1 or TS2 are transmitted consecutively and can only be interrupted by SKIP (SKP) Ordered Sets occurring between Ordered Sets (between consecutive TS1 sets, consecutive TS2 sets, or when TS1 is followed by TS2. In the embodiment depicted in FIG. 2, TS1 can be stored in the local data pattern generator 208 as the local USB data while TS1 or TS2 can be used by the symbol detector 222 as a predefined symbol. For example, once a clock/data recovery (CDR) circuit in the USB analog receiver 102-1 or 102-2 properly recovers data bits, the symbol detector can locate the start of USB data by identifying TS1 or TS2. Table 2 provides an example of the first training sequence (TS1) having a "symbol number" column, an "encoded values" column and a "description" column. Table 3 provides an example of the second training sequence (TS2) having a "symbol number" column, an "encoded values" column and a "description" column. Table 4 provides an example of a SKP ordered set having a "symbol number" column, an "encoded values" column and a "description" column.

TABLE 2

| Symbol Number | Encoded Values | Description            |
|---------------|----------------|------------------------|
| 0-3           | K28.5          | COM (Comma)            |
| 4             | D0.0           | Reserved for future use|
| 5             | TS symbol 5    | Link Functionality     |
| 6-15          | D10.2          | TS1 Identifier         |

TABLE 3

| Symbol Number | Encoded Values | Description            |
|---------------|----------------|------------------------|
| 0-3           | K28.5          | COM (Comma)            |
| 4             | D0.0           | Reserved for future use|
| 5             | TS symbol 5    | Link Functionality     |
| 6-15          | D10.2          | TS2 Identifier         |

TABLE 4

| Symbol Number | Encoded Values | Description |
|---------------|----------------|-------------|
| 0             | K28.1          | SKP         |
| 1             | K28.1          | SKP         |

In some embodiments, the clock frequency recovered in the USB analog receiver 102-1 or 102-2 is the incoming data frequency divided by an integer (e.g., four). In every clock cycle, a fixed number of bits (e.g., four bits) are forwarded to the alignment buffers 224, 226, 228, 230, 232, which are 20 bits wide. In every clock cycle, the buffered USB data are shifted down by four bits and four new bits are shifted in. In an example operation of the data processor 210, the symbol detector 222 searches for a COMMA symbol in USB data buffered in the alignment buffers. The COMMA symbol is a predefined 10-bit data pattern defined by the USB specification that is sent regularly during USB data communication. When a COMMA symbol is detected, the symbol detector stores the value where the first bit of the COMMA symbol is located in a "first_comma_bit" signal. The symbol detector can control the multiplexer 238 based on the detection of the COMMA symbol in buffered USB data. For example, the first_comma_bit signal is used to set the multiplexer 238 from where the bits must be forwarded to the encoder 218 and subsequently to the multiplexer, S3. The multiplexer can forward four bits, which are located at {first_comma_bit, first_comma_bit+1, first_comma_bit+2, first_comma_bit+3}, every clock cycle. The symbol detector also detects the disparity in the buffered USB data and compares the detected disparity value with the disparity value of the local USB data. The symbol detector can control the multiplexer, S3, based on the comparison result. In particular, the symbol detector can control the multiplexer, S3, to allow encoded USB data from the encoder 218 or a delayed version of the encoded USB data from the encoder (e.g., as a result of inserting a SKP ordered set in the encoded USB data by the data inserter 240) to pass through if the disparity value of the buffered USB data matches the disparity value of the local USB data. For example, the USB 3.1 specification requires that one SKP ordered set (OS) is inserted at least once every 354 symbols to compensate for different bit rates between two communicating ports. By inserting a SKP OS just before switching to the encoded data from the encoder 218, it can ensure that there will not more than 354 symbols between 2 SKP OS. For example, a SKP ordered set can be inserted in encoded USB data at the moment that the multiplexer, S1, is controlled to allow the data from the multiplexer, S2, to be transferred to the FIFO buffer. The multiplexer, S2, can be switched on (e.g., by the symbol detector or by an external source) to allow data from the multiplexer, S3, to pass through when the multiplexer, S1, is set to recovered data and 1 SKP OS is inserted. The data processor can also remove or add one or more SKP OS to reduce the number of bits that are stored in the alignment buffers.

Figure 3:
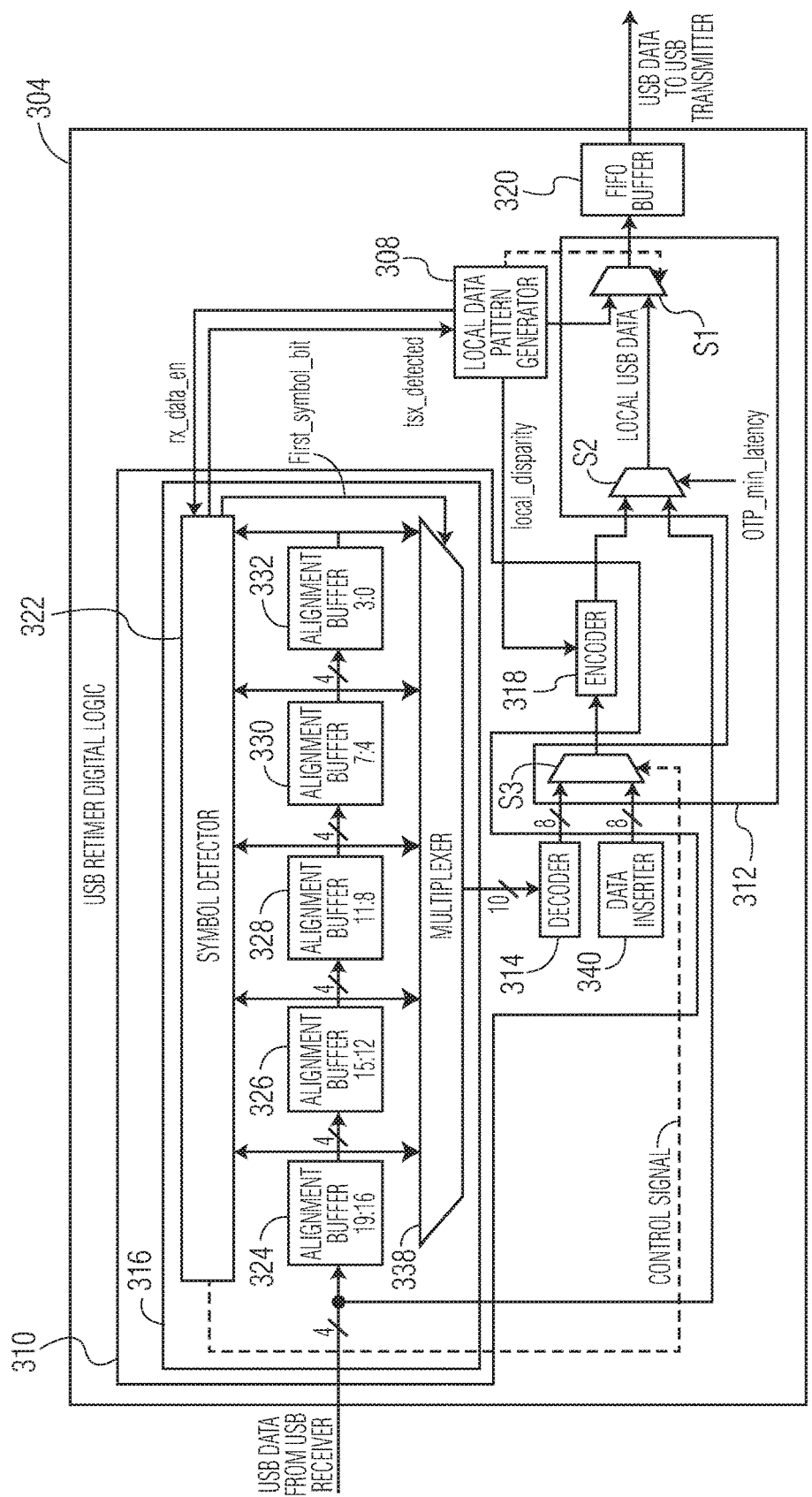
FIG. 3 depicts another embodiment of a USB retimer digital logic of the USB retimer depicted in FIG. 1.

FIG. 3 depicts another embodiment of the USB retimer digital logic 104-1 or 104-2 of the USB retimer 100 depicted in FIG. 1. In the embodiment depicted in FIG. 3, a USB retimer digital logic 304 includes a local data pattern generator 308, a data processor 310 operably connected to the local data pattern generator, a switching system 312, and an optional FIFO buffer 320 for buffering USB data before outputting to the corresponding USB analog transmitter 106-1 or 106-2. The data processor 310 includes a decoder 314 (e.g., an 8b/10b decoder), a buffer device 316, which includes a symbol detector 322, alignment buffers 324, 326, 328, 330, 332, and a multiplexer 338, an encoder 318 (e.g., an 8b/10b encoder), and an optional data inserter 340 (e.g., an SKP data inserter to compensate for different bit rates between communicating ports). The switching system 312 includes three multiplexers, "S1," "S2," "S3." The USB retimer digital logic 304 depicted in FIG. 3 is one possible embodiment of the USB retimer digital logic 104-1 or 104-2 depicted in FIG. 1. For example, the local data pattern generator 308, the data processor 310 and the switching system 312 depicted in FIG. 3 are embodiments of the local data pattern generator 108-1 or 108-2, the data processor 110-1 or 110-2 and the switching system 112-1 or 112-2 depicted in FIG. 1, respectively. The decoder 314, the buffer device 316 and the encoder 318 depicted in FIG. 3 are embodiments of the decoder 114-1 or 114-2, the buffer device 116-1 or 116-2 and the encoder 118-1 or 118-2 depicted in FIG. 1, respectively. However, the USB retimer digital logic 104 depicted in FIG. 1 is not limited to the embodiment shown in FIG. 3. For example, in some embodiments, the USB retimer digital logic does not include the FIFO buffer 320.

The local data pattern generator 308 of the USB retimer digital logic 304 is configured to generate predefined USB data, which may be a data pattern (e.g., a training sequence) that is defined in USB specification, such as the USB 3.1 specification.

The data processor 310 of the USB retimer digital logic 304 is configured to process received USB data and to search for a predefined symbol in a decoded version of the received USB data. The buffer device 316 may be configured to buffer USB data that is received from the corresponding USB analog receiver 102-1 or 102-2) and to search for a predefined symbol in buffered USB data. In some embodiments, each of the alignment buffers 324, 326, 328, 330, 332 is configured to store a number of USB data bits (e.g., 4 bits of decoded USB data). In these embodiments, the symbol detector 322 is configured to search for a predefined symbol in USB data buffered at the alignment buffers and to control the multiplexer 238 to allow certain buffered USB data to pass through. The decoder 314 may be configured to decode USB data received from the multiplexer 338 into decoded USB data. The encoder 318 may be configured to encode the buffered USB data into encoded USB data. The decoder may be an 8b/10b decoder, which decodes received USB data of 10 bits into decoded USB data of 8 bits and the encoder may be an 8b/10b encoder, which encodes USB data of 8 bits into encoded USB data of 10 bits.

The switching system 312 of the USB retimer digital logic 304 is configured to switch from outputting the predefined USB data that is generated by the local data pattern generator 308 to outputting recovered USB data in response to the finding of the predefined symbol in the decoded version of the received USB data. In some embodiments, the switching system is controlled by the local data pattern generator and/or the data processor 310 or an external source. For example, the multiplexer, S1, can be controlled by the local data pattern generator. The multiplexer, S2, can be controlled by the data processor or an external source. The multiplexer, S3, can be controlled by the data processor (e.g., the symbol detector).

The USB retimer digital logic 304 depicted in FIG. 3 operates similarly as the USB retimer digital logic 204 depicted in FIG. 2. A first difference between the USB retimer digital logic 304 depicted in FIG. 3 and the USB retimer digital logic 204 depicted in FIG. 2 is that the USB retimer digital logic 304 depicted in FIG. 3 performs symbol alignment on USB data before data decoding while the USB retimer digital logic 204 depicted in FIG. 2 performs USB data decoding and subsequently performs symbol alignment on decoded USB data. For example, the USB retimer digital logic 304 depicted in FIG. 3 may perform symbol alignment on original USB data having 10 bits per symbol before 8b/10 decoding while the USB retimer digital logic 204 depicted in FIG. 2 may perform 8b/10 decoding and subsequently perform symbol alignment on decoded USB data that has 8 bits per symbol. A second difference between the USB retimer digital logic 304 depicted in FIG. 3 and the USB retimer digital logic 204 depicted in FIG. 2 is that the USB retimer digital logic 304 depicted in FIG. 3 inserts data before data encoding while the USB retimer digital logic 204 depicted in FIG. 2 performs data encoding and subsequently insert data in encoded USB data. For example, the USB retimer digital logic 304 depicted in FIG. 3 may insert SKP data before 8b/10 encoding while the USB retimer digital logic 204 depicted in FIG. 2 may perform 8b/10 encoding and subsequently insert SKP data in encoded USB data.

Figure 4:
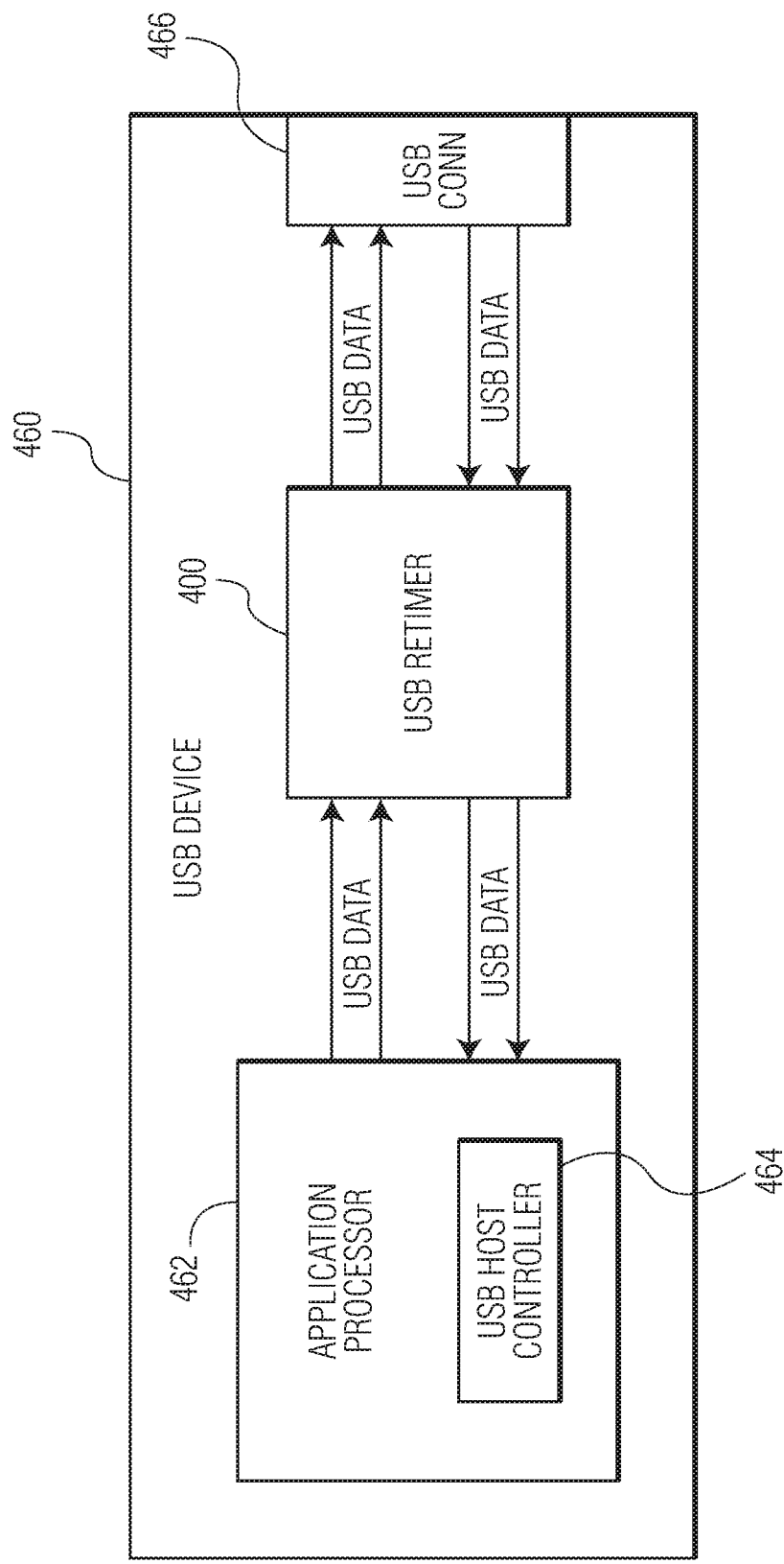
FIG. 4 depicts a USB device in accordance with an embodiment of the invention.

FIG. 4 depicts a USB device 460 in accordance with an embodiment of the invention. In the embodiment depicted in FIG. 4, the USB device is a USB host system that includes a USB retimer 400, an application processor 462 having a USB host controller 464 and a USB connector 466. The USB retimer 400 depicted in FIG. 4 is an embodiment of the USB retimer 100 depicted in FIG. 1. The USB device 460 may be a personal computer (PC) motherboard or other suitable USB host system. In an example operation of the USB device, the USB retimer synchronizes USB data received from the USB connector and sends the synchronized USB data to the application processor for processing. In addition, the USB retimer synchronizes USB data received from the application processor and sends the synchronized USB data to the USB connector for transmission.

Figure 5:
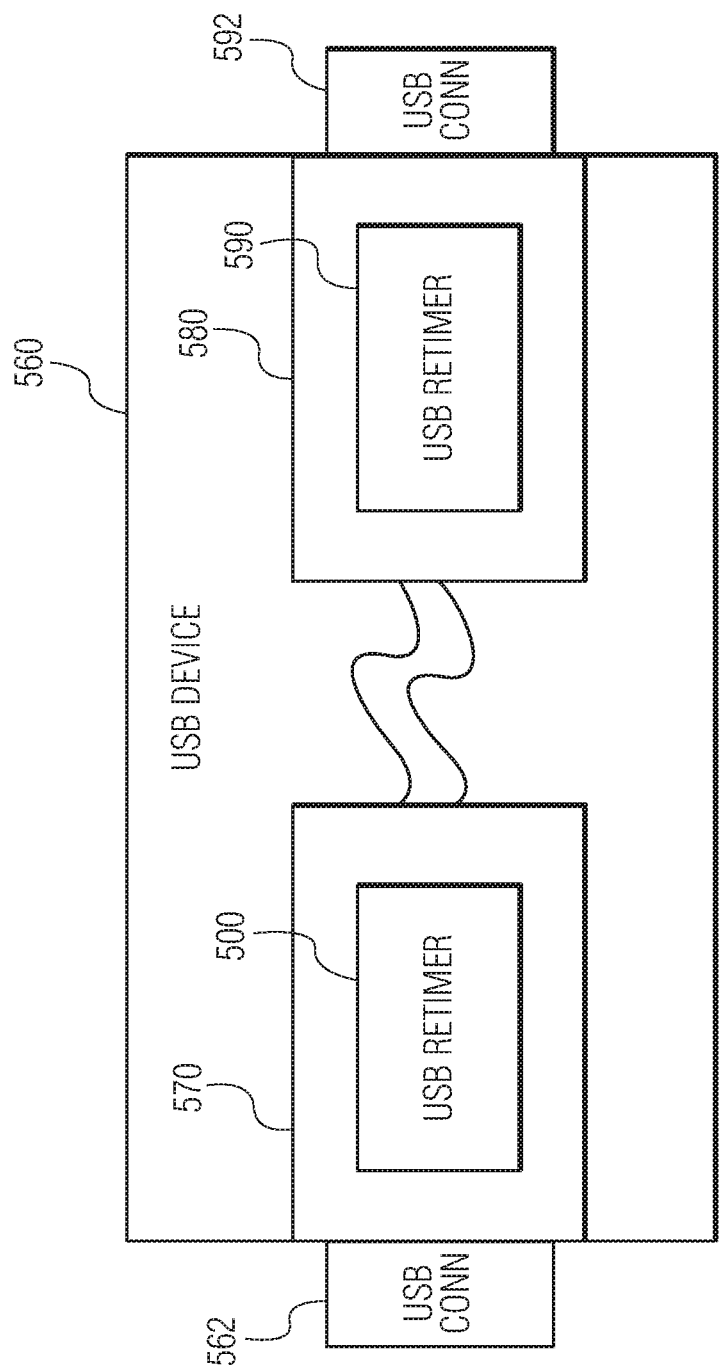
FIG. 5 depicts a USB device in accordance with another embodiment of the invention.

FIG. 5 depicts a USB device 560 in accordance with another embodiment of the invention. In the embodiment depicted in FIG. 5, the USB device is a USB interface device (e.g., a USB cable) that includes a first USB processor 570, which includes a first USB retimer 500, a first USB connector 562 coupled to the first USB processor, a second USB processor 580, which includes a second USB retimer 590, and a second USB connector 592 coupled to the second USB processor. The first USB processor is electrically connected to the second USB processor through, for example, one or more wires. The first USB retimer 500 and the second USB retimer 590 depicted in FIG. 5 are embodiments of the USB retimer 100 depicted in FIG. 1. In an example operation of the USB device, the first USB retimer 500 synchronizes USB data received from the USB connector 562 and sends the synchronized USB data to the second USB retimer 590, which can synchronize received USB data and send the synchronized USB data to the USB connector 592 for transmission. The second USB retimer 590 synchronizes USB data received from the USB connector 592 and sends the synchronized USB data to the first USB retimer 570, which can synchronize received USB data and sends the synchronized USB data to the USB connector 562 for transmission.

Figure 6:
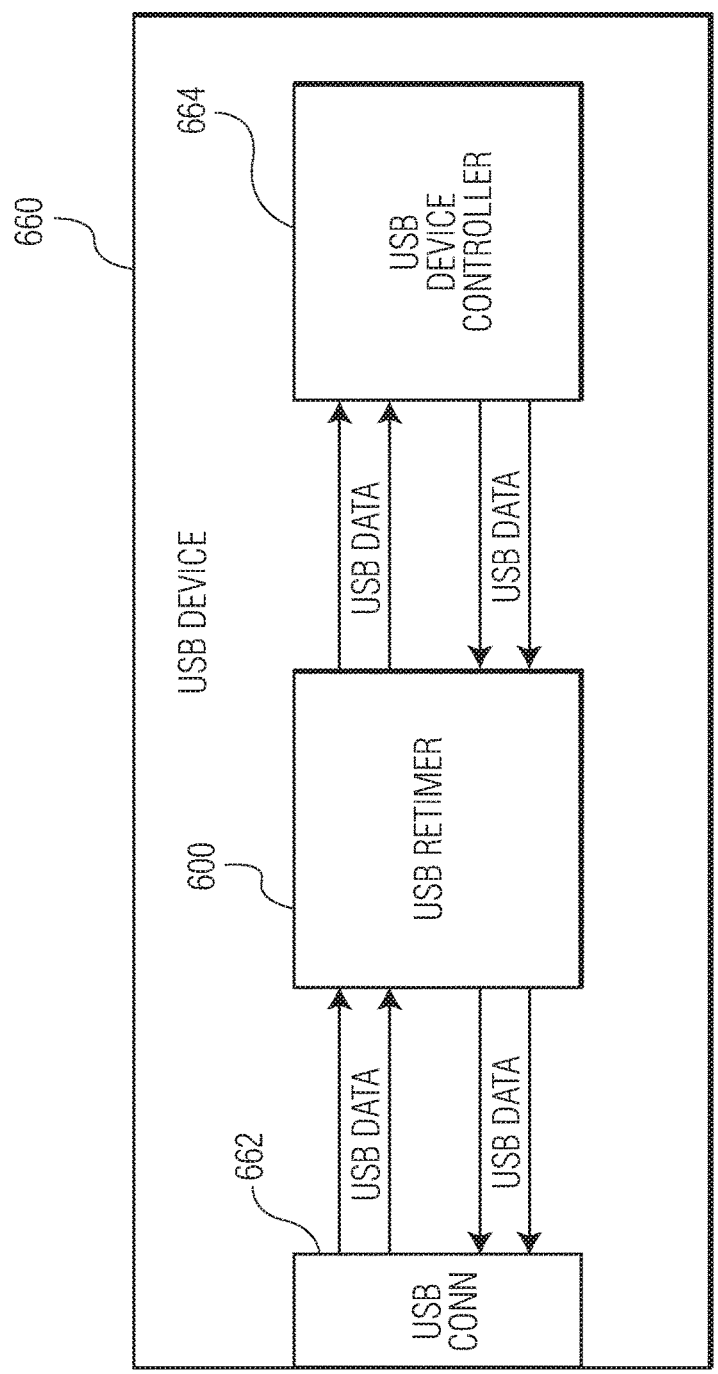
FIG. 6 depicts a USB device in accordance with another embodiment of the invention.

FIG. 6 depicts a USB device 660 in accordance with an embodiment of the invention. In the embodiment depicted in FIG. 6, the USB device includes a USB retimer 600, a USB connector 662 coupled to the USB retimer and a USB device controller 664. The USB retimer 600 depicted in FIG. 6 is an embodiment of the USB retimer 100 depicted in FIG. 1. The USB device 660 may be a hard disk drive, a video camera or other suitable USB device system. In an example operation of the USB device, the USB retimer synchronizes USB data received from the USB connector and sends the synchronized USB data to the USB device controller. In addition, the USB retimer synchronizes USB data received from the USB device controller and sends the synchronized USB data to the USB connector for transmission.

Figure 7:
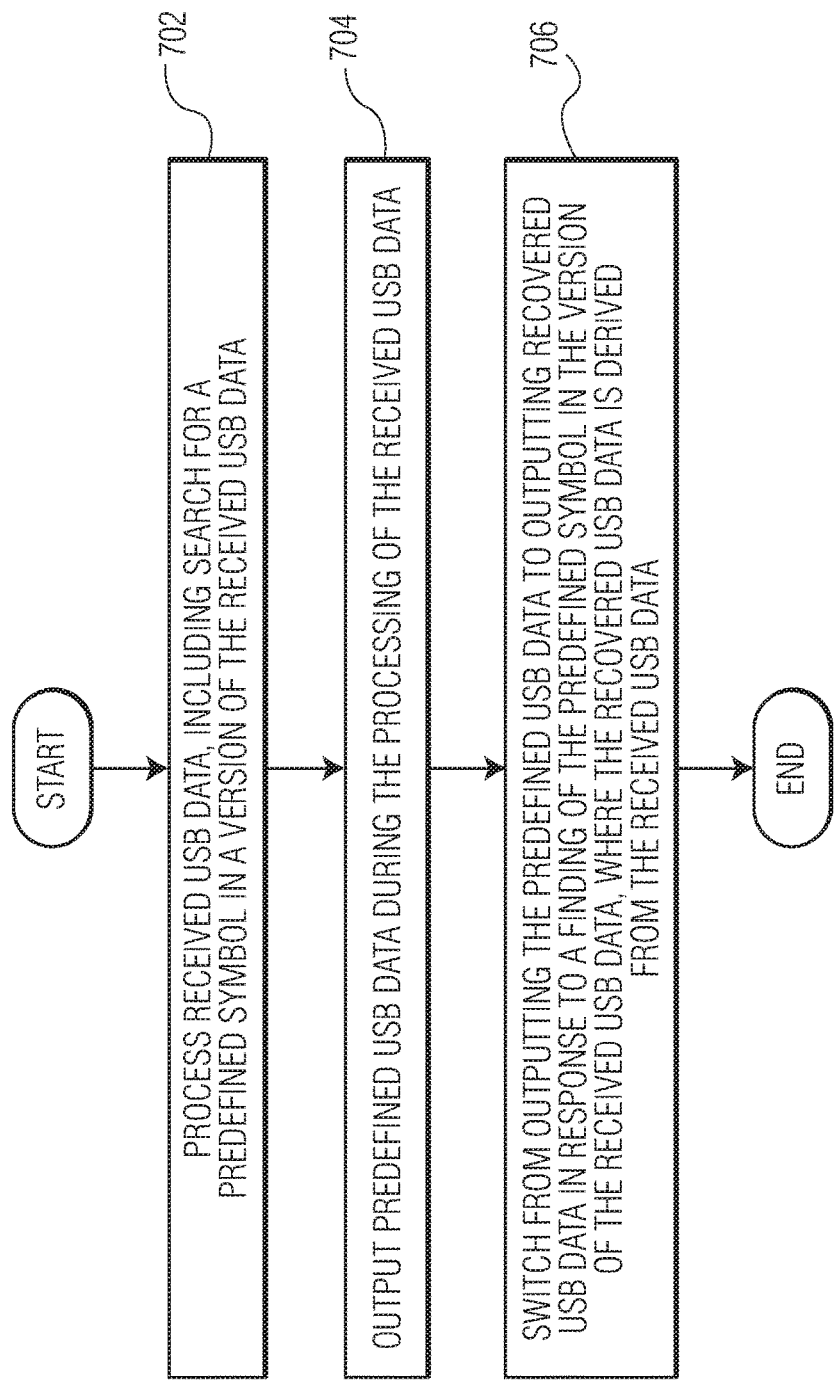
FIG. 7 is a process flow diagram of a method for USB communication in accordance with another embodiment of the invention.

FIG. 7 is a process flow diagram of a method for USB communication in accordance with an embodiment of the invention. At block 702, received USB data is processed. A predefined symbol is searched for in a version of the received USB data. At block 704, predefined USB data is output during the processing of the received USB data. At block 706, it is switched from outputting the predefined USB data to outputting recovered USB data in response to a finding of the predefined symbol in the version of the received USB data. The recovered USB data is derived from the received USB data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for Universal Serial Bus (USB) communication using a USB retimer-repeater logic circuit having a data processor, a data pattern generator and a switching system, the method comprising:
   processing received USB data with the data processor, including searching for a predefined symbol in a version of the received USB data;
   outputting predefined USB data from the data pattern generator coupled to the data processor during the processing of the received USB data; and
   switching, using the switching system coupled to the data pattern generator and the data processor, from outputting the predefined USB data to outputting recovered USB data in response to a finding of the predefined symbol in the version of the received USB data, wherein the recovered USB data is derived from the received USB data;

wherein processing the received USB data comprises: decoding the received USB data into decoded USB data; buffering the decoded USB data; searching for the predefined symbol in buffered USB data; and encoding the buffered USB data into encoded USB data; and wherein encoding the buffered USB data into the encoded USB data comprises encoding a first word of the buffered USB data into a first symbol of the encoded USB data, and wherein a bit length of the first symbol is longer than a bit length of the first word.

2. The method of claim 1, wherein processing the received USB data comprises performing USB data decoding and USB data encoding.

3. The method of claim 1, wherein outputting the predefined USB data during the processing of the received USB data comprises outputting the predefined USB data to a USB device before performing USB data decoding and USB data encoding.

4. The method of claim 1, wherein processing the received USB data comprises comparing a disparity value of the version of the received USB data with a disparity value of the predefined USB data, and wherein switching from outputting the predefined USB data to outputting the recovered USB data comprises switching from outputting the predefined USB data to outputting the recovered USB data if the disparity value of the version of the received USB data matches the disparity value of the predefined USB data.

5. The method of claim 1, wherein switching from outputting the predefined USB data to outputting the recovered USB data comprises controlling a multiplexer into which the predefined USB data and the recovered USB data are input.

6. The method of claim 1, wherein processing the received USB data comprises decoding a first symbol of the version of the received USB data into a first word of decoded USB data, and wherein a bit length of the first symbol is longer than a bit length of the first word.

7. The method of claim 1, wherein processing the received USB data comprises decoding 10-bit symbols of the version of the received USB data into 8-bit words of decoded USB data.

8. The method of claim 1, wherein processing the received USB data comprises:
buffering the received USB data;
searching for the predefined symbol in buffered USB data;
decoding the buffered USB data; and
encoding decoded USB data into encoded USB data.

9. The method of claim 1, wherein processing the received USB data further comprises inserting a predefined data sequence into the encoded USB data in response to a finding of the predefined symbol in the buffered USB data.

10. The method of claim 1, wherein buffering the decoded USB data comprises:
dividing the decoded USB data into a plurality of segments; and
buffering each segment in a different buffer.

11. The method of claim 1, wherein encoding the buffered USB data into the encoded USB data comprises encoding 8-bit words of the buffered USB data into 10-bit symbols of the encoded USB data.

12. The method of claim 1, further comprising buffering the recovered USB data in a first in first out (FIFO) buffer before outputting the recovered USB data to a USB device.

13. The method of claim 1, further comprising outputting the received USB data to a USB device.

14. A Universal Serial Bus (USB) retimer logic circuit, the USB retimer logic circuit comprising:

a local data pattern generator configured to generate predefined USB data;

a data processor operably connected to the local data pattern generator and configured to process received USB data, including searching for a predefined symbol in a version of the received USB data; and a switching system configured to switch from outputting the predefined USB data to outputting recovered USB data in response to a finding of the predefined symbol in the version of the received USB data, wherein the recovered USB data is derived from the received USB data;

wherein the data processor is configured to compare a disparity value of the version of the received USB data with a disparity value of the predefined USB data, and wherein the switching system is configured to switching from outputting the predefined USB data to outputting the recovered USB data if the disparity value of the version of the received USB data matches the disparity value of the predefined USB data.

15. The USB retimer logic circuit of claim 14, wherein the switching system is configured to output the predefined USB data to a USB device before USB data decoding and USB data encoding are performed on the received USB data.

16. The USB retimer logic circuit of claim 14, wherein the data processor comprises: a decoder configured to decode received USB data into decoded USB data;
a buffer device configured to buffer the decoded USB data and to search for the predefined symbol in buffered USB data; and
an encoder configured to encode the buffered USB data into encoded USB data.

17. A Universal Serial Bus (USB) retimer, the USB retimer comprising:
first and second USB receivers;
first and second USB transmitters; and
first and second USB retimer logic circuits connected between the first and second USB receivers and the first and second USB transmitters, wherein each of the first and second USB retimer logic circuits comprises:
a local data pattern generator configured to generate predefined USB data;
a data processor operably connected to the local data pattern generator, wherein the data processor comprises:
an 8b/10b decoder configured to decode 10-bit symbols of received USB data from a corresponding USB receiver of the first and second USB receivers into 8-bit words of decoded USB data;
a buffer device configured to buffer the decoded USB data and to search for a predefined symbol in buffered USB data; and
an 8b/10b encoder configured to encode 8-bit words of the buffered USB data into 10-bit symbols of encoded USB data; and
a switching system configured to switch from outputting the predefined USB data to a corresponding USB transmitter of the first and second USB transmitters to outputting recovered USB data to the corresponding USB transmitter of the first and second USB transmitters in response to a finding of the predefined symbol in the buffered USB data, wherein the recovered USB data is a version of the encoded USB data.

18. A method for Universal Serial Bus (USB) communication using a USB retimer-repeater logic circuit having a data processor, a data pattern generator and a switching system, the method comprising:

processing received USB data with the data processor, including searching for a predefined symbol in a version of the received USB data;

outputting predefined USB data from the data pattern generator coupled to the data processor during the processing of the received USB data; and switching, using the switching system coupled to the data pattern generator and the data processor, from outputting the predefined USB data to outputting recovered USB data in response to a finding of the predefined symbol in the version of the received USB data, wherein the recovered USB data is derived from the received USB data;

wherein processing the received USB data comprises comparing a disparity value of the version of the received USB data with a disparity value of the predefined USB data; and wherein switching from outputting the predefined USB data to outputting the recovered USB data comprises switching from outputting the predefined USB data to outputting the recovered USB data if the disparity value of the version of the received USB data matches the disparity value of the predefined USB data.

19. A method for Universal Serial Bus (USB) communication using a USB retimer-repeater logic circuit having a data processor, a data pattern generator and a switching system, the method comprising:

processing received USB data with the data processor, including searching for a predefined symbol in a version of the received USB data;

outputting predefined USB data from the data pattern generator coupled to the data processor during the processing of the received USB data; and switching, using the switching system coupled to the data pattern generator and the data processor, from outputting the predefined USB data to outputting recovered USB data in response to a finding of the predefined symbol in the version of the received USB data, wherein the recovered USB data is derived from the received USB data;

wherein processing the received USB data comprises:
 decoding the received USB data into decoded USB data;
 buffering the decoded USB data;
 searching for the predefined symbol in buffered USB data; and
 encoding the buffered USB data into encoded USB data; and wherein processing the received USB data further comprises inserting a predefined data sequence into the encoded USB data in response to a finding of the predefined symbol in the buffered USB data.

20. The method of claim 1, wherein the method of USB communication conforms to a USB 3.1 specification standard.

21. The method of claim 1, wherein the processing, outputting and switching within the USB retimer-repeater logic circuit synchronize the recovered USB data with the received USB data to mitigate deterioration the received USB data.

* * * * *